US007864300B2

(12) United States Patent
Lee et al.

(10) Patent No.: US 7,864,300 B2

(45) Date of Patent: Jan. 4, 2011

(54) DOOR OPENING AND CLOSING UNIT TO CONTROL DOOR ROTATING SPEED AND IMAGE FORMING APPARATUS HAVING THE SAME

(75) Inventors: Jin-soo Lee, Suwon-si (KR); Bong-hwan Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 256 days.

(21) Appl. No.: 12/025,993

(22) Filed: Feb. 5, 2008

(65) Prior Publication Data

US 2008/0197757 A1 Aug. 21, 2008

(30) Foreign Application Priority Data

Feb. 15, 2007 (KR) ...................... 10-2007-0016215

(51) Int. Cl.
*G03B 27/62* (2006.01)

(52) U.S. Cl. ......................... 355/75; 399/377; 399/379; 399/380; 358/497; 358/498

(58) Field of Classification Search ................... 16/357, 16/360; 355/75; 399/377, 379, 380; 358/497, 358/498

See application file for complete search history.

(56) References Cited

U.S. PATENT DOCUMENTS 4,882,807 A * 11/1989 Frye et al. ...................... 16/225
4,953,259 A * 9/1990 Frye et al. ...................... 16/225
4,995,143 A * 2/1991 Demura et al. ................ 16/357
5,669,107 A * 9/1997 Carlsen et al. ................ 16/348
6,292,981 B1 * 9/2001 Ford et al. ..................... 16/357
6,344,968 B2 2/2002 Kim et al.
6,347,818 B1 * 2/2002 Lyons, Sr. ................... 292/271
6,390,697 B1 5/2002 O'Mera et al.
6,862,858 B2 * 3/2005 Salice ........................ 52/584.1
7,337,499 B2 * 3/2008 Zhang et al. .................. 16/357
2006/0029424 A1 2/2006 Kawai et al.

(Continued)

FOREIGN PATENT DOCUMENTS

GB 2070129 A * 9/1981

(Continued)

OTHER PUBLICATIONS

Extended European Search Report, mailed Nov. 23, 2009, in corresponding European Application No. 08150733.7 (6 pp.).

*Primary Examiner*—Jerry Redman
(74) *Attorney, Agent, or Firm*—Staas & Halsey LLP

(57) ABSTRACT

A door opening and closing unit is provided for an image forming apparatus. The image forming apparatus includes a main body, and a door rotatably mounted on the main body. The door opening and closing unit includes a door speed control unit coupling the door to the main body that includes a coupling boss; and a guide groove that engages the coupling boss and along which the coupling boss moves as the door rotates relative to the main body; wherein the door speed control unit controls a frictional force between the coupling boss and the guide groove according to a rotating angle of the door relative to the main body to control a rotating speed of the door as the door rotates relative to the main body.

18 Claims, 12 Drawing Sheets

U.S. PATENT DOCUMENTS

2006/0104664 A1 5/2006 Nakahata

FOREIGN PATENT DOCUMENTS

| | | |
|---|---|---|
| JP | 4-184361 | 7/1992 |
| JP | 2002-123154 | 4/2002 |
| KR | 2006-52605 | 5/2006 |
| KR | 2006-66273 | 6/2006 |
| WO | 97/18087 | 5/1997 |

* cited by examiner

DOOR OPENING AND CLOSING UNIT TO CONTROL DOOR ROTATING SPEED AND IMAGE FORMING APPARATUS HAVING THE SAME

CROSS-REFERENCE TO RELATED APPLICATIONS

This application claims the benefit of Korean Patent Application No. 2007-16215 filed on Feb. 15, 2007, in the Korean Intellectual Property Office, the disclosure of which is incorporated herein by reference in its entirety.

BACKGROUND OF THE INVENTION

1. Field of the Invention

Aspects of the invention relate to a door opening and closing unit, and an image forming apparatus having the same, and more particularly to a door opening and closing unit capable of controlling a rotating speed of a door while the door rotates, and an image forming apparatus having the same.

2. Description of the Related Art

In general, an image forming apparatus forms an image on a printing medium according to a printing signal supplied from a host apparatus. An image forming apparatus may include a printing medium feeding unit that stores and feeds a printing medium, an image forming unit that forms an image on the printing medium fed by the printing medium feeding unit, and a discharging unit that discharges the printing medium with the image formed thereon outside the image forming apparatus. An image forming apparatus may be a monochrome image forming apparatus in which a monochrome image is formed on a printing medium using a single color, such as a black-and-white image formed using a black color, or a color image forming apparatus in which a color image is formed on a printing medium using a combination of colors, such as a color image formed using yellow, magenta, cyan, and black colors.

FIG. 1 is a diagram of a color image forming apparatus 10 according to the related art. The image forming apparatus 10 includes a door 20, a printing medium feeding unit (not shown) that stores and feeds a printing medium P in the direction indicated by the straight single-headed arrow, developing devices 30 provided for each of four colors yellow (Y), magenta (M), cyan (C), and black (K) that store a developer and supply the developer in the form of an image to be transferred onto the printing medium, a printing medium conveying belt 23*c* that conveys the printing medium to each of the developing devices 30, a belt driving unit 23*a*, 23*b* that drives the printing medium conveying belt 23*c*, and transfer units 25 respectively provided for each of the developing devices 30 that transfer the developer supplied by the developing devices 30 onto the printing medium. Each of the developing devices 30 includes a photosensitive body 31 on which an electrostatic latent image is formed and then developed by a developer. The printing medium conveying belt 23*c*, the belt driving unit 23*a*, 23*b*, and the transfer units 25 are mounted on the door 20. The door 20 is rotatably mounted so that the door 20 can be rotated between a closed position as shown in FIG. 1, and a fully open position (not shown) as indicated by the curved double-headed arrow.

During an image forming operation of the image forming apparatus 10, a printing medium fed by the printing medium feeding unit (not shown) is conveyed by the printing medium conveying belt 23*c* to contact the photosensitive bodies 31 of the developing devices 30. The transfer units 25 apply a predetermined transfer voltage to a rear surface of the printing medium conveying belt 23*c* to transfer the developer in the form of an image from the photosensitive bodies 31 onto the printing medium to form an image on the printing medium.

If the printing medium jams between the developing devices 30 and the printing medium conveying belt 23*c*, the door 20 is opened to separate the printing medium conveying belt 23*c* from the developing devices 30 to enable easy removal of the jammed printing medium. Also, if the developer stored in the developing devices 30 is used up, the door 20 is opened to separate the printing medium conveying belt 23*c* from the developing devices 30 to enable the developing devices 30 to be replaced.

However, if the user lets go of the door 20 after opening it and before the door 20 has reached the fully open position, the door 20 will rotate at a high speed until it comes to a sudden stop in the fully open position, which will cause an impact to be applied to the door 20. The impact may be quite large because the door 20 is heavy since the printing medium conveying belt 23*c*, the belt driving unit 23*a*, 23*b* and the transfer units 25 are mounted on the door 20.

The impact applied to the door 20 causes an impact to be applied to the printing medium conveying belt 23*c* and the transfer units 25, thereby deforming the printing medium conveying belt 23*c* and the transfer units 25. If the printing medium conveying belt 23*c* is deformed, a color registration error occurs, thereby deteriorating a printing quality. Also, if the transfer units 25 are deformed, the time when the developer is transferred from the developing devices 30 to the printing medium and the value of the transfer voltage are mismatched among the transfer units, thereby deteriorating the printing quality.

SUMMARY OF THE INVENTION

Aspects of the invention relate to a door opening and closing unit capable of controlling a rotating speed of a door so as to reduce an impact transmitted to the door as the door is rotated to a fully open position, and to an image forming apparatus having the same.

According to an aspect of the invention, a door opening and closing unit is provided for an image forming apparatus. The image forming apparatus includes a main body, and a door rotatably mounted on the main body. The door opening and closing unit includes a door speed control unit coupling the door to the main body that includes a coupling boss; and a guide groove that engages the coupling boss and along which the coupling boss moves as the door rotates relative to the main body; wherein the door speed control unit controls a frictional force between the coupling boss and the guide groove according to a rotating angle of the door relative to the main body to control a rotating speed of the door as the door rotates relative to the main body.

According to an aspect of the invention, the door speed control unit gradually reduces a rotating speed of the door as the door rotates from a closed position in which the door is rotated against the main body to a fully open position in which the door is rotated away from the main body as far as it will go.

According to an aspect of the invention, the guide groove includes a starting point at which the coupling boss is positioned when the door is in the closed position; and an ending point at which the coupling boss is positioned when the door is in the fully open position; wherein a width of the guide groove at the starting point is greater than a width of the coupling boss.

According to an aspect of the invention, the width of the guide groove decreases from the starting point to the ending point according to a distance along the groove from the starting point.

According to an aspect of the invention, the door speed control unit further includes a frictional member disposed so that the coupling boss is in contact with the frictional member as the coupling boss moves along the guide groove as the door rotates relative to the main body; and wherein a thickness of the frictional member increases from the starting point of the guide groove to the ending point of the guide groove according to a distance along the guide groove from the starting point.

According to an aspect of the invention, the frictional member is a sponge member, or a brush member, or a fiber member, or a rubber member.

According to an aspect of the invention, the door speed control unit further includes a speed control groove provided on one side of the guide groove inclined at a predetermined angle with respect to a lengthwise direction of the guide groove.

According to an aspect of the invention, the guide groove includes a starting point at which the coupling boss is positioned when the door is in the closed position; and an ending point at which the coupling boss is positioned when the door is in the fully open position, and wherein the predetermined angle is an angle that causes a distance between the guide groove and the speed control groove to increase from the starting point to the ending point according to a distance along the guide groove from the starting point.

According to an aspect of the invention, the door opening and closing unit further includes a link member rotatably mounted on the main body or the door; wherein if the link member is rotatably mounted on the door, the door speed control unit couples the link member to the door; and wherein if the link member is rotatably mounted on the door, the door speed control unit couples the link member to the main body.

According to an aspect of the invention, if the link member is rotatably mounted on the main body, the coupling boss is provided on the door and the guide groove is provided on the link member, or the coupling boss is provided on the link member and the guide groove is provided on the door; and wherein if the link member is rotatably mounted on the door, the coupling boss is provided on the main body and the guide groove is provided on the link member, or the coupling boss is provided on the link member and the guide groove is provided on the main body.

According to an aspect of the invention, an image forming apparatus includes a main body that includes a printing medium feeding unit to feed a printing medium, and a developing device to supply a developer in a form of an image to be transferred onto the printing medium fed by the printing medium feeding unit; a door rotatably mounted on the main body, the door including a transfer unit to transfer the developer in the form of an image supplied by the developing device onto the printing medium; and a door opening and closing unit including a door speed control unit coupling the door to the main body, the door speed control unit including a coupling boss; and a guide groove that engages the coupling boss and along which the coupling boss moves as the door rotates relative to the main body; wherein the door speed control unit controls a frictional force between the coupling boss and the guide groove according to a rotating angle of the door relative to the main body to control a rotating speed of the door as the door rotates relative to the main body.

According to an aspect of the invention, the door speed control unit gradually reduces a rotating speed of the door as the door rotates from a closed position in which the door is rotated against the main body to a fully open position in which the door is rotated away from the main body as far as it will go, and the image forming apparatus further includes a link member rotatably mounted on the main body or the door; wherein if the link member is rotatably mounted on the main body, the door speed control unit couples the link member to the door; and wherein if the link member is rotatably mounted on the door, the door speed control unit couples the link member to the main body.

According to an aspect of the invention, the image forming apparatus further includes a door hinge unit provided between the door and the main body to rotatably mount the door on the main body; and a link hinge unit; wherein the link hinge unit is provided between the link member and the main body to rotatably mount the link member on the main body if the link member is rotatably mounted on the main body; and wherein the link hinge unit is provided between the link member and the door to rotatably mount the link member on the door if the link member is rotatably mounted on the door.

According to an aspect of the invention, the door hinge unit and the link hinge unit are separated from each other.

Additional aspects and/or advantages of the invention will be set forth in part in the description that follows, and, in part, will be obvious from the description, or may be learned by practice of the invention.

BRIEF DESCRIPTION OF THE DRAWINGS

The above and/or other aspects of the invention will become apparent and more readily appreciated from the following description of embodiments of the invention, taken in conjunction with the accompanying drawings of which.

DETAILED DESCRIPTION OF THE EMBODIMENTS

Figure 1:
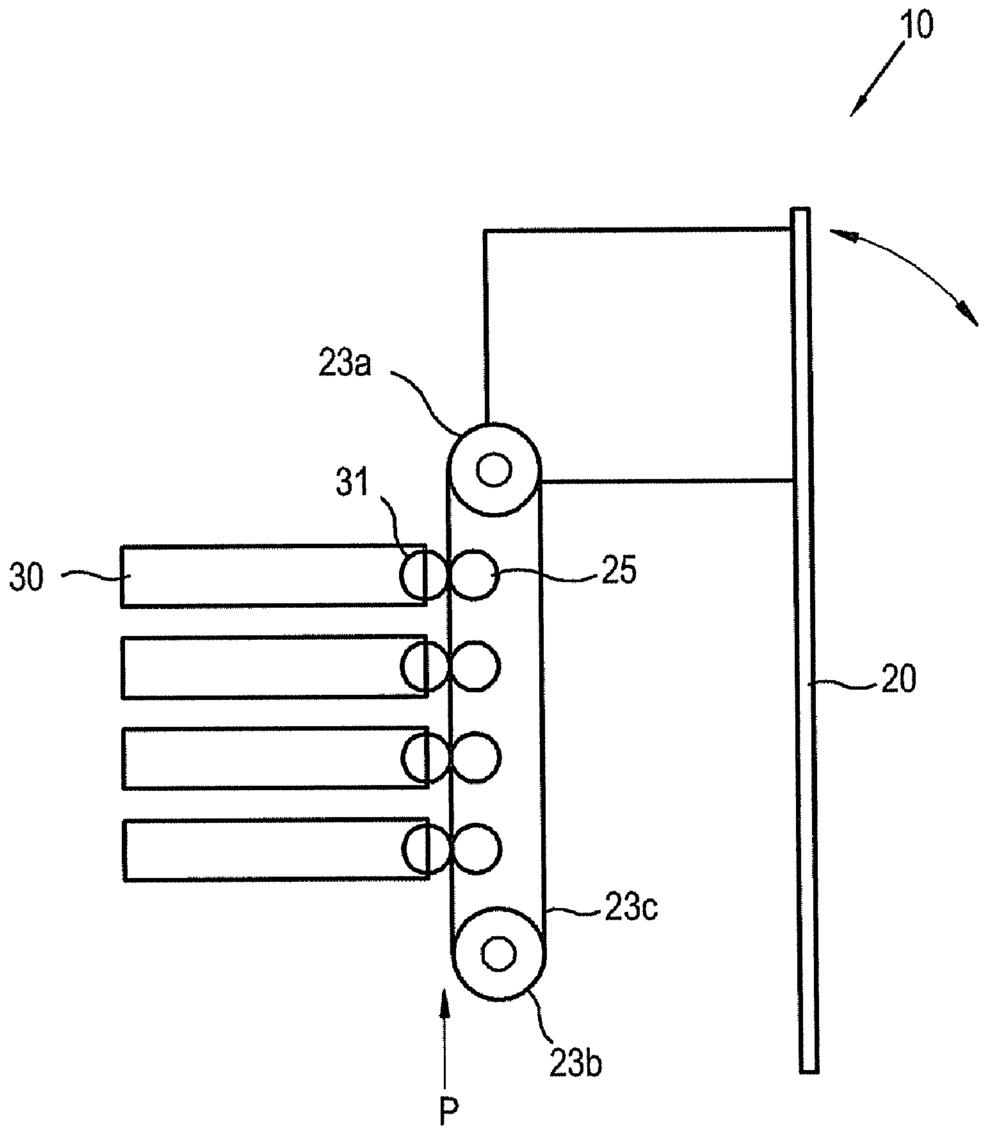
FIG. 1 (RELATED ART)
FIG. 1 is a diagram of a color image forming apparatus according to the related art.

Reference will now be made in detail to embodiments of the invention, examples of which are shown in the accompanying drawings, wherein like reference numerals refer to like elements throughout. The embodiments are described below in order to explain the invention by referring to the figures.

Figure 2:
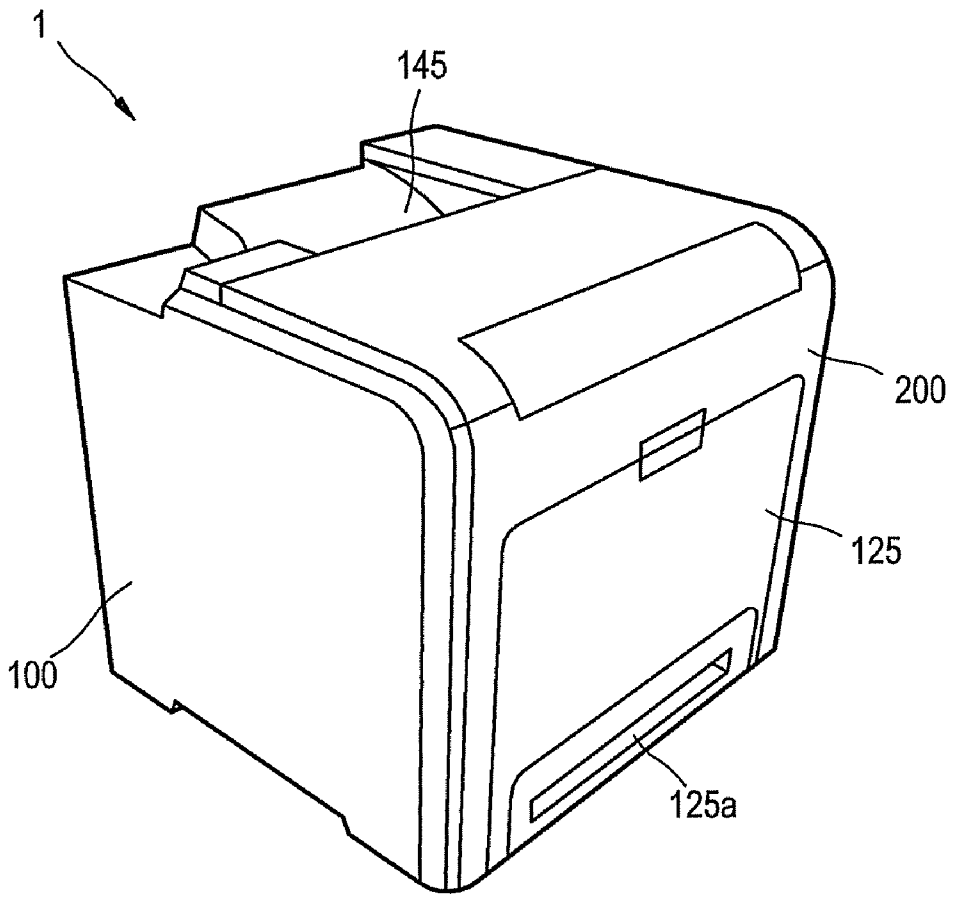
FIG. 2 is a perspective view of an image forming apparatus according to an aspect of the invention.
Figure 3A:
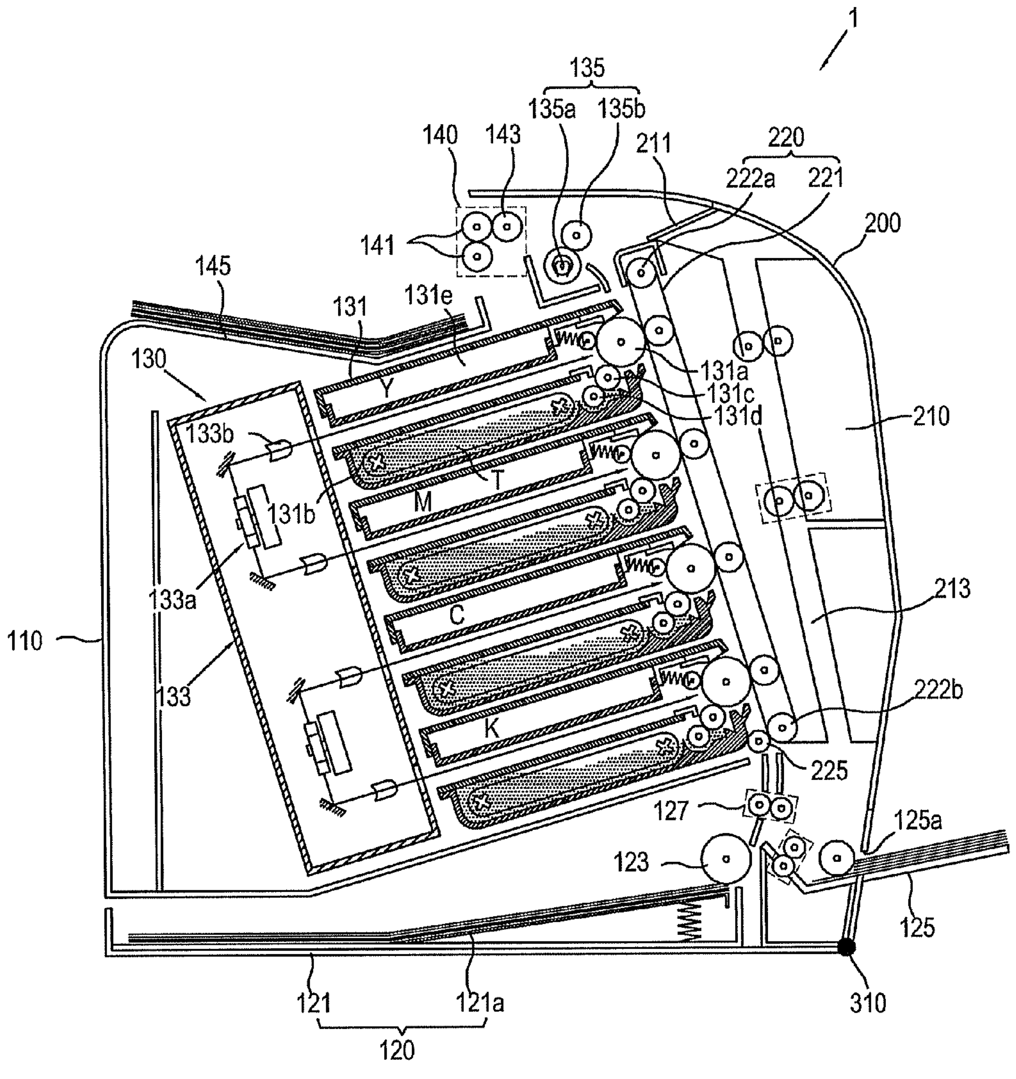
FIG. 3A is a diagram of an image forming apparatus with a door in a closed position according to an aspect of the invention.
Figure 3B:
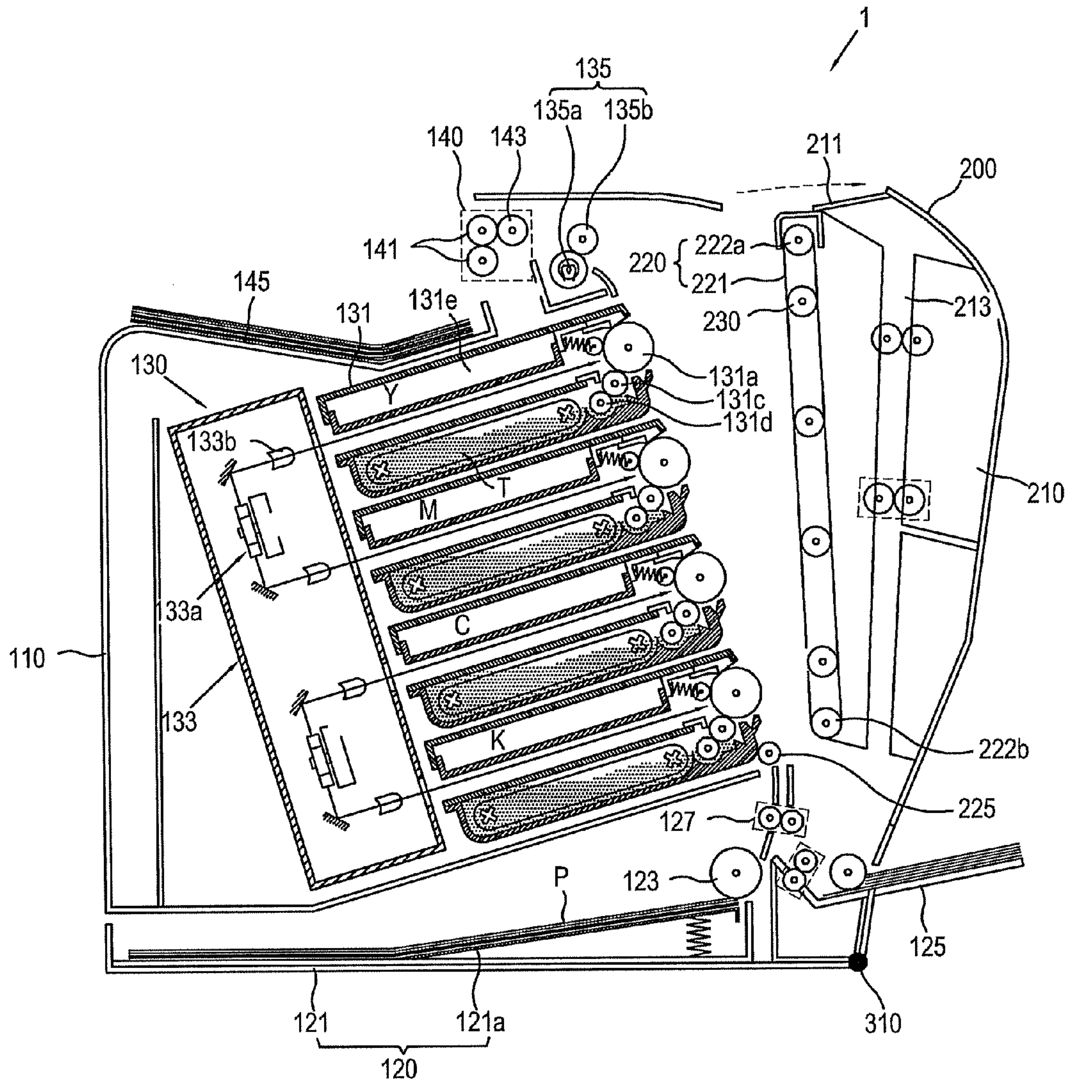
FIG. 3B is a diagram of an image forming apparatus with a door in a partially open position according to an aspect of the invention.

FIG. 2 is a perspective view of an image forming apparatus 1 according to an aspect of the invention, FIG. 3A is a diagram of the image forming apparatus 1 with a door 200 in a closed position according to an aspect of the invention, and FIG. 3B is a diagram of the image forming apparatus 1 with the door 200 in a partially open position according to an aspect of the invention.

As shown in FIGS. 2, 3A, and 3B, the image forming apparatus 1 according to an aspect of the invention includes a main body 100 that includes a printing medium feeding unit 120, an image forming unit 130, and a discharging unit 140; the door 200 on which a printing medium conveying belt unit 220 and transfer units 230 are mounted, and which is rotatable between a closed position (see FIG. 3A) in which the door 200 is rotated against the main body 100, and an open position (see FIG. 3B which shows a partially open position) in which the door 200 is rotated away from the main body 100; and a door opening and closing unit 300 (see FIG. 4) that rotatably couples the door 200 to the main body 100 and controls a rotating speed of the door 200.

The main body 100 includes a main body casing 110 that supports the printing medium feeding unit 120, the image forming unit 130, and the discharging unit 140 and protects these components from an external impact. The printing medium feeding unit 120 stores and feeds a printing medium, the image forming unit 130 forms an image on the printing medium fed by the printing medium feeding unit 120, and the discharging unit 140 discharges the printing medium with the image formed thereon outside the image forming apparatus onto a printing medium discharge area 145.

The printing medium feeding unit 120 includes a first feeding cassette 121 mounted inside the main body 100 that stores a printing medium and supplies the printing medium to the image forming unit 130, and a second feeding cassette 125 mounted outside the main body 100 that stores a printing medium and supplies the printing medium to the image forming unit 130 through a slot 125*a* in the door 200. The second feeding cassette 125 may be rotatably mounted on the door 200 so it can be rotated between a closed position as shown in FIG. 2 and an open position as shown in FIGS. 3A and 3B. Alternatively, the second feeding cassette 125 may be detachably mounted on the door 200. The printing medium feeding unit 120 also includes a pick-up roller 123 that picks up the printing medium stored in either the first feeding cassette 121 or the second feeding cassette 125 according to a user's selection, and a registering roller 127 that registers a leading edge of the printing medium picked up by the pick-up roller 123 and supplies the printing medium to the image forming unit 130. A detailed description of the printing medium feeding unit 120 will be omitted because its operation is known in the related art. However, it is understood that other configurations of the printing medium feeding unit 120 may be used according to other aspects of the invention.

The image forming unit 130 includes developing devices 131 provided for each of four colors yellow (Y), magenta (M), cyan (K), and black (K) that store a developer T and supply the developer in the form of an image to be transferred onto a printing medium, an exposure unit 133 that scans a light beam across a photosensitive body 131*a* of each of the developing devices 131 to form an electrostatic latent image on the photosensitive body 131*a*, and a fusing unit 135 that applies heat and pressure to the printing medium onto which the developer in the form of an image has been transferred to fuse the developer onto the printing medium. Each of the developing devices 131 includes the photosensitive body 131*a*, a developer storing unit 131*b* that stores the developer, a developing roller 131*c* that transfers the developer onto the photosensitive body 131*a* to develop the electrostatic latent image formed on the photosensitive body 131*a* to form the developer in the form of an image to be transferred onto the printing medium, a supplying roller 131*d* that supplies the developer stored in the developer storing unit 131*b* to the developing roller 131*c*, and a waste developer storing unit 131*e* that stores waste developer that is not transferred onto the printing medium but remains attached to the photosensitive body 131*a*.

The developing devices 131 provided for each of the colors yellow (Y), magenta (M), cyan (C), and black (B) sequentially transfer the developer in the form of K, C, M, and Y images onto the printing medium conveyed by a printing medium conveying belt 221 of the printing medium conveying belt unit 220. A detailed description of the developing devices 131 will be omitted because their operation is known in the related art. However, it is understood that other configurations of the image forming unit 130 and the developing devices 131, and/or other colors, and/or other combinations of colors may be used according to other aspects of the invention.

As indicated above, the exposure unit 133 scans a light beam across the photosensitive body 131*a* provided in each of the developing devices 131 to form an electrostatic latent image on the photosensitive body 131*a*. The exposure unit 133 has a multi-light beam scanning configuration that enables the exposure unit 133 to scan respective light beams across all of the photosensitive bodies 131*a* at the same time. The exposure unit 133 includes a light source (not shown) to generate a light beam, a polygon mirror 133*a* that rotates and deflects the light beam generated by the light source as it rotates to scan the light beam along a path, and an f-θ lens 133*b* that images the scanned light beam from the polygon mirror 133*a* onto the photosensitive body 131*a* to form an electrostatic latent image thereon. The light source (not shown) generates four light beams, one for each of the four photosensitive bodies 131*a*, and may have a configuration of a plurality of luminescent points, or a configuration of a semiconductor element having a single luminescent point to correspond to each of the colors. As shown in FIGS. 3A and 3B, two polygon mirrors 133*a* are provided, and each of the two polygon mirrors 133*a* scans two light beams generated the light source along two different paths. Four f-θ lenses 133*b* are provided, one on each of the four paths scanned by the two polygon mirrors 133*a*. Accordingly, a light beam can be separately scanned with respect to the four photosensitive bodies 131*a*. However, it is understood that the exposure unit 133 may have other configurations according to other aspects of the invention.

The image forming unit 130 according to the above-described aspect of the invention has been described as a single-path color type image forming unit having a plurality of exposure units 133 for forming a color image on a printing medium, but may also be a multi-path type image forming unit having only one exposure unit 133 for forming a color image on a printing medium, or a monochrome type image forming unit having only a black color developing device for forming a black-and-white image on a printing medium. However, it is understood that other types of image forming units may be used according to other aspects of the invention.

The fusing unit 135 applies heat and pressure to the printing medium onto which the YMCK developers in the form of an image have been transferred to fuse the YMCK developers onto the printing medium, thereby forming a color image on the printing medium. The fusing unit 135 includes a heating roller 135*a* that applies heat to the printing medium, and a pressing roller 135*b* that opposes the heating roller 135*a* and applies pressure to the printing medium. However, it is understood that other configurations of the fusing unit 135 may be used according to other aspects of the invention.

The discharging unit 140 discharges the printing medium with the color image formed thereon outside the image forming apparatus 1 onto the printing medium discharge area 145. The discharging unit 140 includes a discharge roller 143 and a pair of outlet rollers 141. However, it is understood that other configurations of the discharging unit 140 and the printing medium discharge area 145 may be used according to other aspects of the invention.

As discussed above, the door 200 is rotatable between the closed position in which the door 200 is rotated against the main body 100 as shown in FIG. 3A, and an open position in which the door 200 is rotated away from the main body 100, such as the partially open position shown in FIG. 3B. The door 200 includes a door main body 210 rotatably coupled to the main body 100, the printing medium conveying belt unit 220 that is mounted on the door main body 210 and sequentially conveys the printing medium fed by the printing medium feeding unit 120 to each of the developing devices 131, and the transfer units 230 that are mounted on the door main body 210 and contact a rear surface of the printing medium conveying belt 221 when the door 200 is in the closed position to apply a predetermined transfer voltage to the rear surface of the printing medium conveying belt 221 to transfer the developers in the form of an image from the photosensitive bodies 131*a* onto the printing medium.

The door main body 210 is rotatable between a closed position in which the door main body 210 is rotated against the main body 100 as shown in FIG. 3A, and an open position in which the door main body 210 is rotated away from the main body 100, such as the partially open position shown in FIG. 3B. The door main body 210 includes a locking rib 211 that locks the door main body 210 in the closed position when the door main body 210 is closed, and may include a double-sided conveying path 213 through which the printing medium is re-conveyed to the image forming unit 130 if a double-sided printing function is selected. As shown in FIGS. 3A and 3B, the locking rib 211 projects from the door main body 210, and is accommodated in a locking unit (not shown) of the main body 100 that locks the door main body 210 to the main body 100 in the closed position when the door main body 210 is rotated against the main body 100 so that the door main body 210 cannot rotate away from the main body 100 without first being unlocked.

During an image forming operation performed when the door main body 210 is in the closed position, the printing medium conveying belt unit 220 sequentially conveys the printing medium fed by the printing medium feeding unit 120 after being picked up by the pick-up roller 123 to each of the developing devices 131. The printing medium conveying belt unit 220 includes the printing medium conveying belt 221 and a belt driving unit 222*a*, 222*b* that drives the printing medium conveying belt 221. The printing medium conveying belt 221 is made of a material capable of holding an electric charge, and is charged to a predetermined voltage by a belt electrifying roller 225, thereby generating a static electric charge on the surface of the printing medium conveying belt 221 that holds the printing medium fed from the registering roller 127 of the printing medium feeding unit 120 to the surface of the printing medium conveying belt 221 so that the printing medium conveying belt 221 can sequentially convey the printing medium to each of the developing devices 131. However, it is understood that other methods of holding the printing medium to the surface of the printing medium conveying belt 221 may be used according to other aspects of the invention.

The belt driving unit 222*a*, 222*b* is provided at opposite ends of the printing medium conveying belt 221 to drive the printing medium conveying belt 221. The belt driving unit 222*a*, 222*b* is coupled to a driving unit (not shown) of the main body 100 to receive a driving force from the driving unit when the door main body 210 is in the closed position. However, it is understood that other configurations of the belt driving unit 222*a*, 222*b* may be used according to other aspects of the invention.

The transfer units 230 that contact the rear surface of the printing medium conveying belt 221 are mounted at positions corresponding to the photosensitive bodies 131*a* of the developing devices 131. The transfer units 230 are generally provided in the form of a transfer roller, and apply a predetermined transfer voltage that is determined based on the thickness and the resistance characteristic of the printing medium to the rear surface of the printing medium through the printing medium conveying belt 221. Accordingly, the developers in the form of an image on the photosensitive bodies 131*a* are transferred onto the printing medium. A detailed description of the transfer units 230 will be omitted because their operation is known in the related art.

Figure 4:
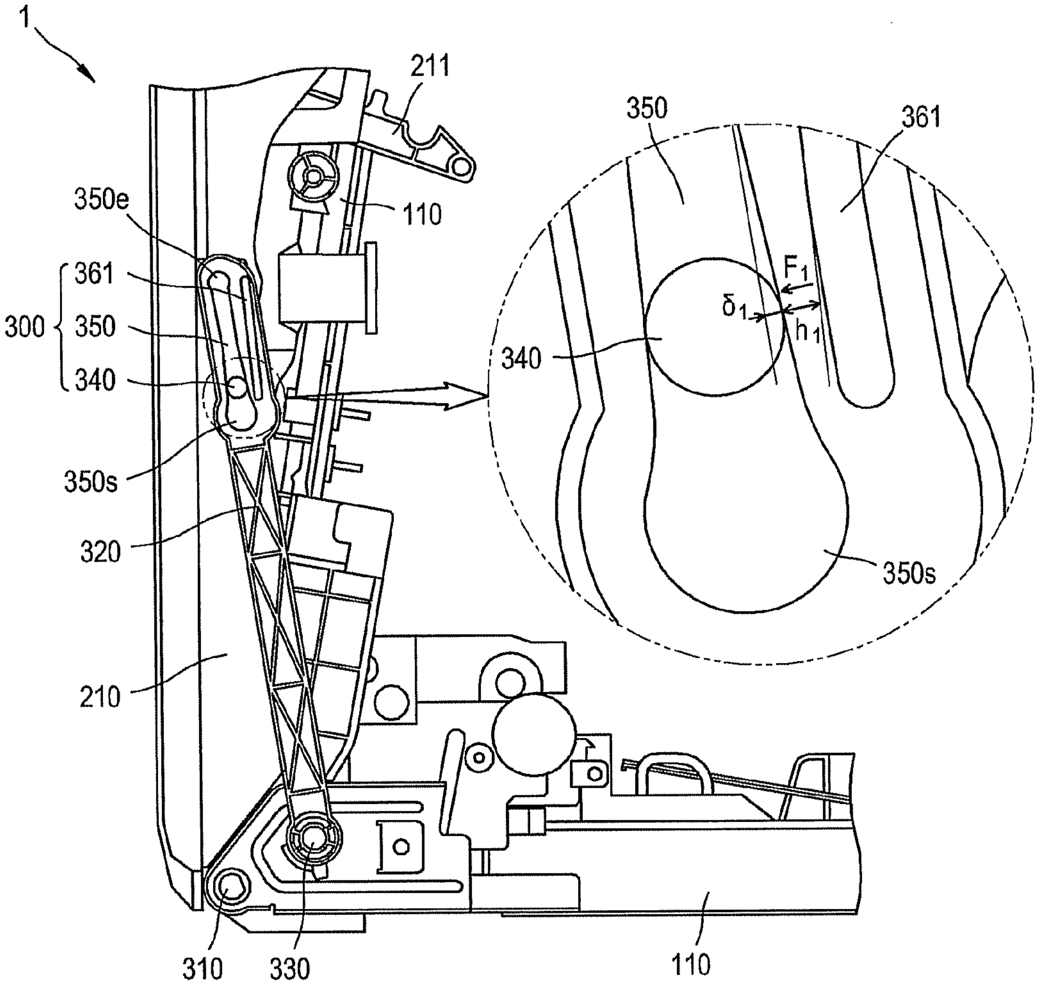
FIG. 4 is a partial diagram of an image forming apparatus with a door in a closed position according to an aspect of the invention.
Figure 5:
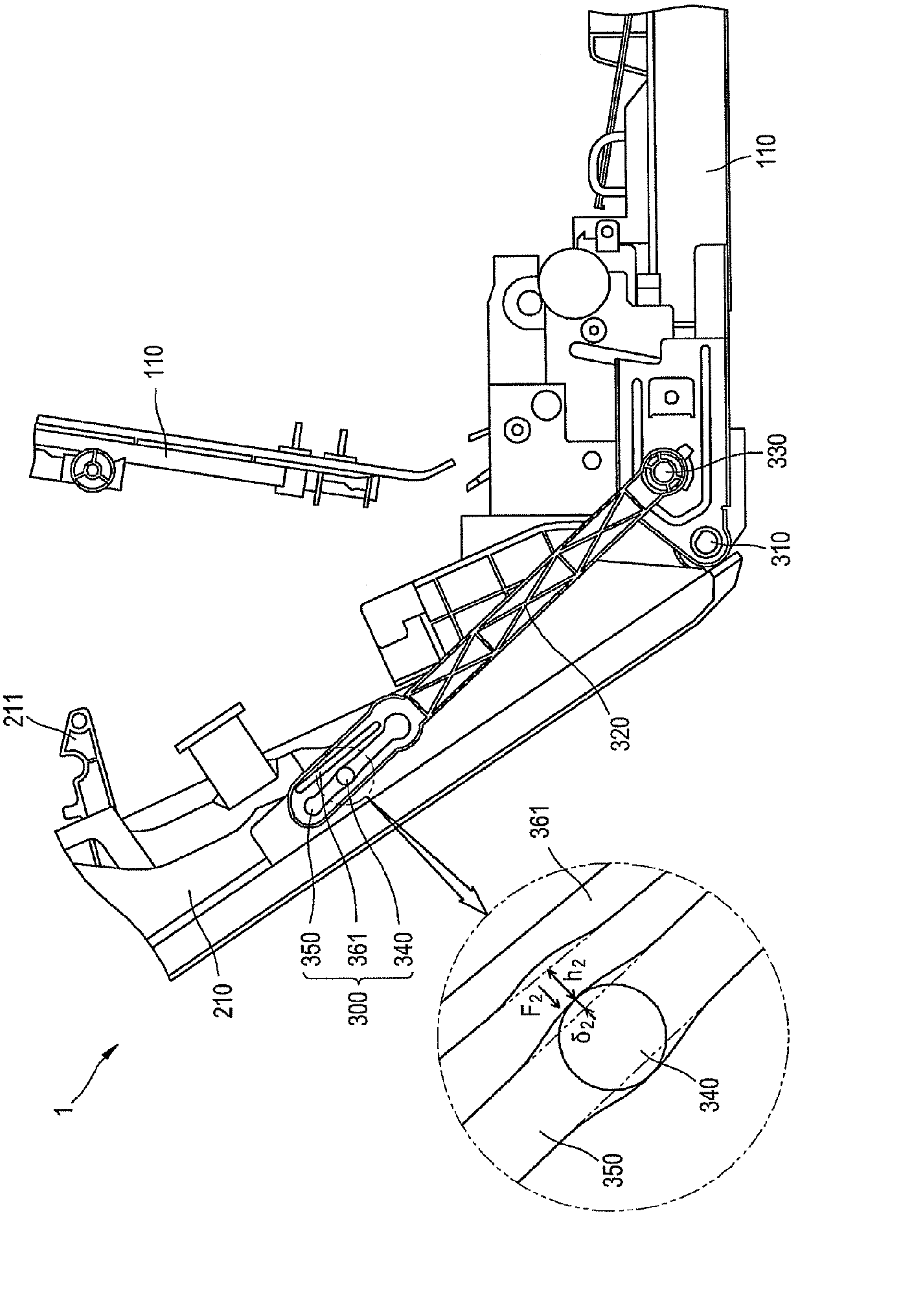
FIG. 5 is a partial diagram of an image forming apparatus with a door in a partially open position according to an aspect of the invention.
Figure 6:
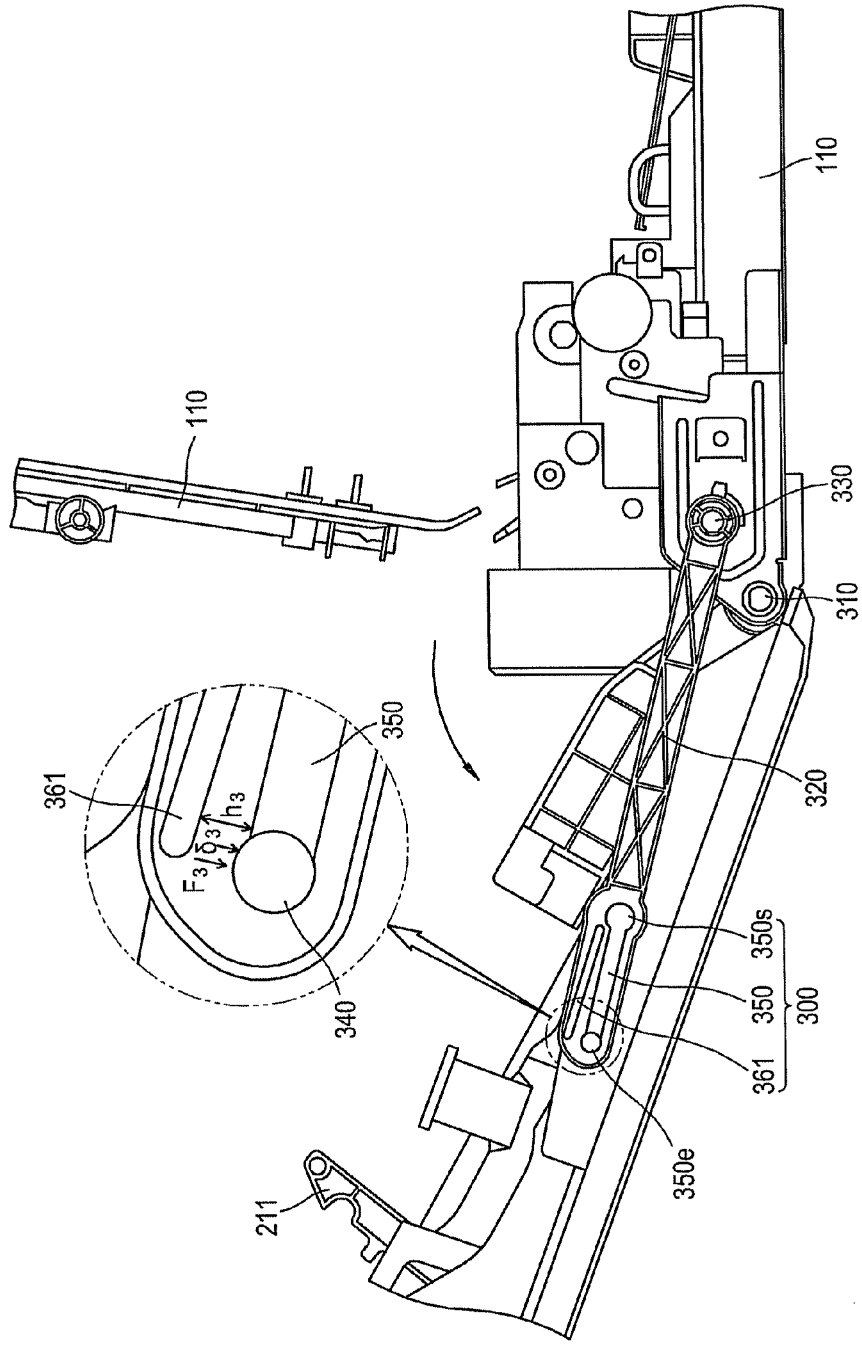
FIG. 6 is a partial diagram of an image forming apparatus with a door in a fully open position according to an aspect of the invention.

As shown in FIGS. 4, 5, and 6, the door opening and closing unit 300 couples the door 200 to the main body 100 and enables the door 200 to rotate between the closed position (see FIG. 4) in which the door 200 is rotated against the main body 100, a partially open position (see FIG. 5) in which the door 200 is rotated away from the main body 100, and a fully open position (see FIG. 6) in which the door 200 is rotated away from the main body 100 as far as it will go. The door opening and closing unit 300 includes a door hinge 310 that rotatably couples the door 200 to the main body 100, a link member 320 that slideably couples the door 200 to the main body 100, a link hinge 330 that rotatably couples a first end of the link member 320 to the main body 100, a coupling boss 340 provided on the door 200, a guide groove 350 provided on a second end of the link member 320 along which the coupling boss 340 slides as the door 200 is rotated, and a speed control groove 361 provided on one side of the guide groove 350 to control the rotating speed of the door 200. The coupling boss 340, the guide groove 350, and the speed control groove 361 constitute an example of a door speed control unit 360 (see FIG. 7A) according to an aspect of the invention.

The door hinge 310 rotatably couples the door 200 to the main body 100 to allow the door 200 to rotate. The link member 320 slideably couples the door 200 to the main body 100 to restrict the rotating angle and the rotating speed of the door 200. The link member 320 may be made of plastic or any other suitable material. The door opening and closing unit 300 according to an aspect of the invention shown in FIGS. 4-6 has one link member 320, but a plurality of link members 320 may be provided if desired and/or necessary, such as when the door 200 is too heavy for one link member 320.

Although the coupling boss 340 is provided on the door 200 and the guide groove 350 and the speed control groove 361 are provided on the link member 320 according to an aspect of the invention shown in FIGS. 4-6, the guide groove 350 and the speed control groove 361 may be provided on the door 200 and the coupling boss 340 may be provided on the link member 320 according to other aspects of the invention.

Also, according to other aspects of the invention, the link hinge 330 may be provided on the door 200, with the coupling boss 340 being provided on the main body 100, and the guide groove 350 and the speed control groove 361 being provided on the link member 320, or with the coupling boss 340 being provided on the link member 320, and the guide groove 350 and the speed control groove 361 being provided on the main body 100.

In the door opening and closing unit 300 according to an aspect of the invention, if the user lets go of the door 200 after opening it, the coupling boss 340 slides along the guide groove 350 to restrict the rotating angle and the rotating speed of the door 200 as the door 200 rotates away from the main body 100 under its own weight.

The guide groove 350 has a predetermined length that enables the door 200 to be rotated between the closed position shown in FIG. 4 and the fully open position shown in FIG. 6.

The guide groove 350 has a predetermined length L. The coupling boss 340 is located at a starting point 350*s* of the guide groove 350 when the door 200 is in the closed position as shown in FIG. 4, is located somewhere between the starting point 350*s* of the guide groove 350 and an ending point 350*e* of the guide groove 350 when the door 200 is in a partially open position as shown in FIG. 5, and is located at an the ending point 350*e* of the guide groove 350 when the door 200 is in the fully open position as shown in FIG. 6. The maximum rotating angle by which the door 200 can be rotated away from the main body 100 can be controlled by controlling the length L of the guide groove 350. The longer the length L of the guide groove 350 is, the larger the maximum rotating angle of the door 200 will be.

The door hinge 310 and the link hinge 330 may be separated from each other as shown in FIGS. 4-6. Alternatively, the door hinge 310 and the link hinge 330 may be located at the same position according to other aspects of the invention. The starting point 350*s* and the ending point 350*e* of the guide groove 350 can be determined according to the positions of the door hinge 310 and the link hinge 330 and the distance between them. If the door hinge 310 is located closer to an outside of the main body casing 110 compared to the link hinge 330 as shown in FIGS. 4-6, the ending point 350*e* of the guide groove 350 is provided at the opposite end of the link member 320 from the link hinge 330 and the starting point 350*s* of the guide groove 350 is provided closer to the link hinge 330 as shown in FIGS. 4-6. However, if the link hinge 330 is located closer to the outside of the main body casing 110 compared to the door hinge 310 and there is a difference between a rotating radius of the door 200 and a rotating radius of the link member 320, the starting point 350*s* of the guide groove 350 may be provided at the opposite end of the link member 320 from the link hinge 330 and the ending point 350*e* of the guide groove 350 may be provided closer to the link hinge 330.

Figure 7A:
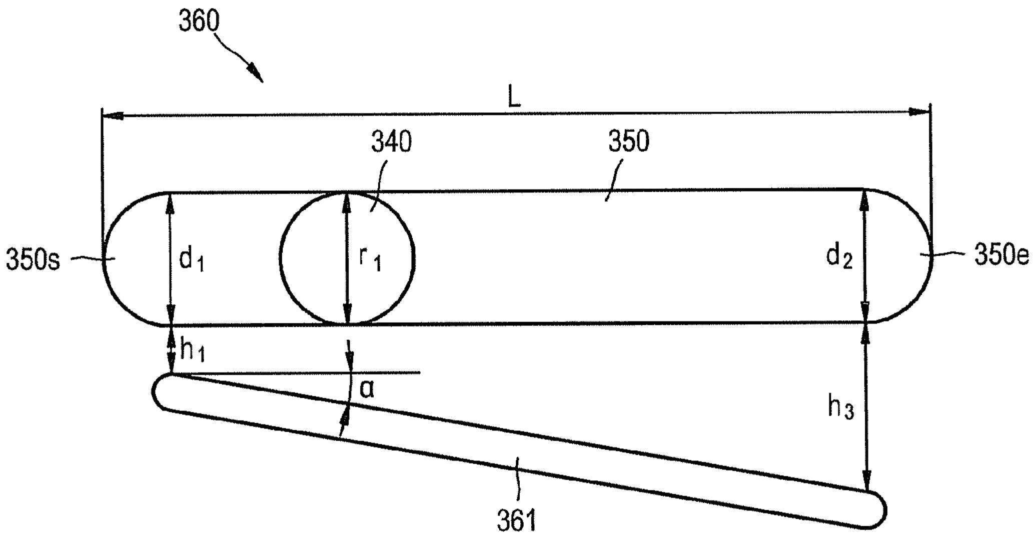
FIGS. 7A through 7D are diagrams of a door speed control unit according to aspects of the invention.

FIG. 7A shows the door speed control unit 360 according to an aspect of the invention shown in FIGS. 4-6, and FIGS. 7B-7D show examples of door speed control units 360 according to other aspects of the invention. The door speed control units 360 shown in FIGS. 7A-7D control the rotating speed of the door 200 by controlling a frictional force applied to the coupling boss 340 as the coupling boss 340 slides along the guide groove 350 as the door 200 rotates.

As shown in FIG. 7A, the door speed control unit 360 may include a speed control groove 361 provided on one side of the guide groove 350 and inclined at a predetermined angle $\alpha$ with respect to a lengthwise direction of the guide groove 350. The distance h from the guide groove 350 to the speed control groove 361 gradually increases from h1 at the starting point 350*s* to h3 at the ending point 350*e* (h3>h1).

The pressure applied to the coupling boss 340 by the sides of the guide groove 350 increases as the coupling boss 340 moves along the guide groove 350 from the starting point 350*s* to the ending point 350*e* because the amount of material of the link member 320 between the guide groove 350 and the speed control groove 361 increases as the distance h increases from the starting point 350*s* to the ending point 350*e*. The coupling boss 340 elastically deforms the guide groove 350 as the coupling boss 340 moves along the guide groove 350 from the starting point 350*s* to the ending point 350*e*, and since the amount of material of the link member 320 between the guide groove 350 and the speed control groove 361 increases as the coupling boss 340 moves closer to the ending point 350*e*, there is more material of the link member 320 to resist the elastic deformation of the guide groove 350 by the coupling boss 340 as the coupling boss 340 moves closer to the ending point 350*e*, which increases the pressure applied to the coupling boss 340 by the sides of the guide groove 350. This causes an amount of the elastic deformation produced by the coupling boss 340 to be greatest at the starting point 350*s*, and to be least at the ending point 350*e*. If the door 200 rotates under its own weight and the coupling boss 340 moves along the guide groove 350 from the starting point 350*s* to the ending point 350*e* according to the rotation of the door 200, the pressure applied to the coupling boss 340 by the sides of the guide groove 350 increases as the coupling boss 340 moves closer to the ending point 350*e*. This causes the frictional force between the guide groove 350 and the coupling boss 340 to increase, which causes the rotating speed of the door 200 on which the coupling boss 340 is provided to decrease.

An amount by which the rotating speed of the door 200 is reduced can be adjusted by changing the predetermined angle $\alpha$ at which the speed control groove 361 is inclined with respect to the guide groove 350. As the predetermined angle $\alpha$ increases, the amount by which the rotating speed of the door 200 is reduced increases.

Although FIG. 7A shows the speed control groove 361 as being a linear groove, it may be a curved groove according to other aspects of the invention. Also, although FIG. 7A shows the width of the speed control groove 361 as being uniform, the width of the speed control groove 361 may be non-uniform according to other aspects of the invention.

Figure 7B:
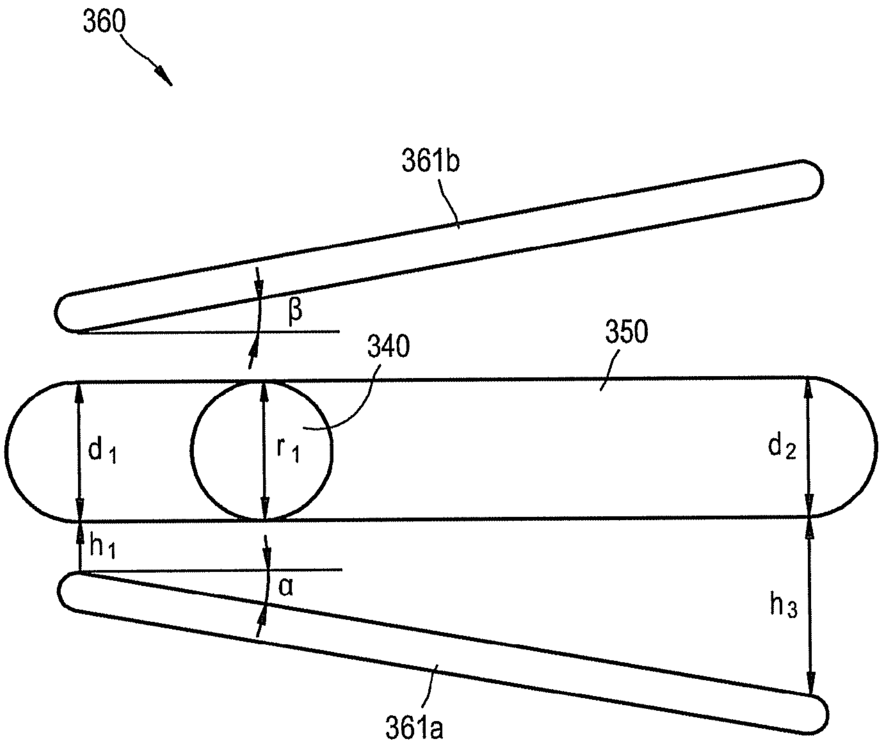

As shown in FIG. 7B, the door speed control unit 360 may include two speed control grooves 361*a* and 361*b* provided on opposite sides of the guide groove 350. The speed control groove 361*a* may be inclined at a predetermined angle $\alpha$ with respect to the guide groove 350. The speed control groove 361*b* may be inclined at a different predetermined angle $\beta$ ($\alpha \neq \beta$) with respect to the guide groove 350. However, it is understood that the speed control groove 361*b* may be inclined at the same predetermined angle $\alpha$ with respect to the guide groove 350 according to other aspects of the invention. Also, the respective distances h1 between the speed control grooves 361*a* and 361*b* and the guide groove 350 at the starting point 350*s* may be the same, or may be different, and/or the respective distances h3 between the speed control grooves 361*a* and 361*b* and the guide groove 350 at the ending point 350*e* may be the same, or may be different.

As shown in FIGS. 7A and 7B, the width d of the guide groove 350 may be uniform so that the width d1 at the starting point 350*s* is the same as the width d2 at the ending point 350*e* (d1=d2). In this case, the width d of the guide groove 350 should be smaller than the diameter of the coupling boss 340 (d<r1) so that the coupling boss 340 can elastically deform the guide groove 350 as the coupling boss 340 moves along the guide groove 350, or else the speed control unit 360 will not be able to reduce the rotating speed of the door 200 as the door 200 rotates away from the main body 100.

Figure 7C:
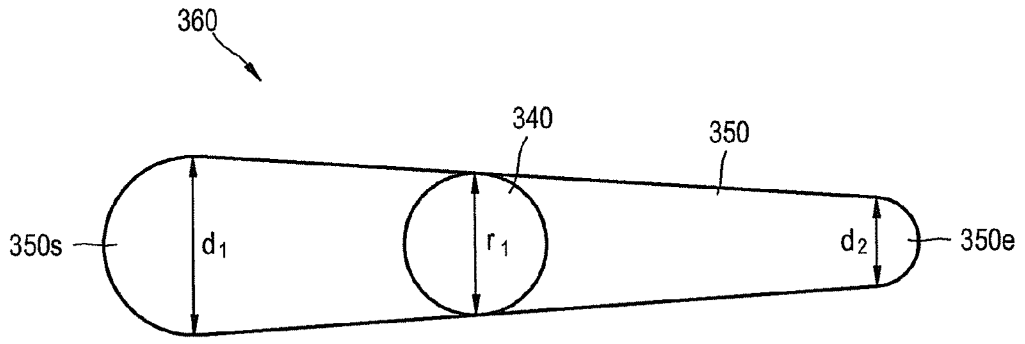

Alternatively, as shown in FIG. 7C, the width d of the guide groove 350 may gradually decrease from d1 at the starting point 350s to d2 at the ending point 350e ($d1>d2$). In this case, the width d1 of the guide groove 350 at the starting point 350s may be larger than the diameter r1 of the coupling boss 340 ($d1>r1$), and the width d2 of the guide groove 350 at the ending point 350e may be smaller than the diameter r1 of the coupling boss 340 ($d2<r1$). Alternatively, according to other aspects of the invention, the width d1 of the guide groove 350 at the starting point 350s may be equal to the diameter r1 of the coupling boss 340 ($d1=r1$), and the width d2 of the guide groove 350 at the ending point 350e may be smaller than the diameter r1 of the coupling boss 340 ($d2<r1$), or the width d1 of the guide groove 350 at the starting point 350s may be smaller than the diameter r1 of the coupling boss 340 ($d1<r1$), and the width d2 of the guide groove 350 at the ending point 350e may be smaller than the width d1 of the guide groove 350 at the starting point 350s and smaller than the diameter r1 of the coupling boss 340 ($d2<d1<r1$). In any event, the width d of the guide groove 350 should decrease to a width that is smaller than the diameter of the coupling boss 340 ($d<r1$) at some point before the ending point 350e so that the coupling boss 340 can elastically deform the guide groove 350 as the coupling boss 340 moves along the guide groove 350, or else the door speed control unit 360 will not be able to reduce the rotating speed of the door 200 as the door 200 rotates away from the main body 100.

The change in the width d of the guide groove 350 from d1 at the starting point 350s to d2 at the ending point 350e as shown in FIG. 7C should be gradual, and the total amount of the change should relatively small. The permissible total amount of the change in the width d of the guide groove 350 and the rate at which the width d changes (i.e., the change in the width d per unit distance in the lengthwise direction of the guide groove 350) depend at least in part on the elastic properties of the link member 320 in which the guide groove 350 is formed, and should be within a range in which the coupling boss 340 can elastically deform the guide groove 350 as the coupling boss 340 moves along the guide groove 350 according to the rotation of the door 200. If the width d of the guide groove 350 becomes too narrow or decreases too rapidly in comparison with the diameter r1 of the coupling boss 340 and the rotation speed of the door 200 as the coupling boss 340 moves toward the ending point 350e, the door 200 may suddenly stop in the middle of its rotation range because the range in which the coupling boss 340 can elastically deform the guide groove 350 has been exceeded. This sudden stop will apply an impact to the door 200, and this impact can be transmitted to the transfer units 230 and the printing medium conveying belt unit 220 mounted on the door 200.

Figure 7D:
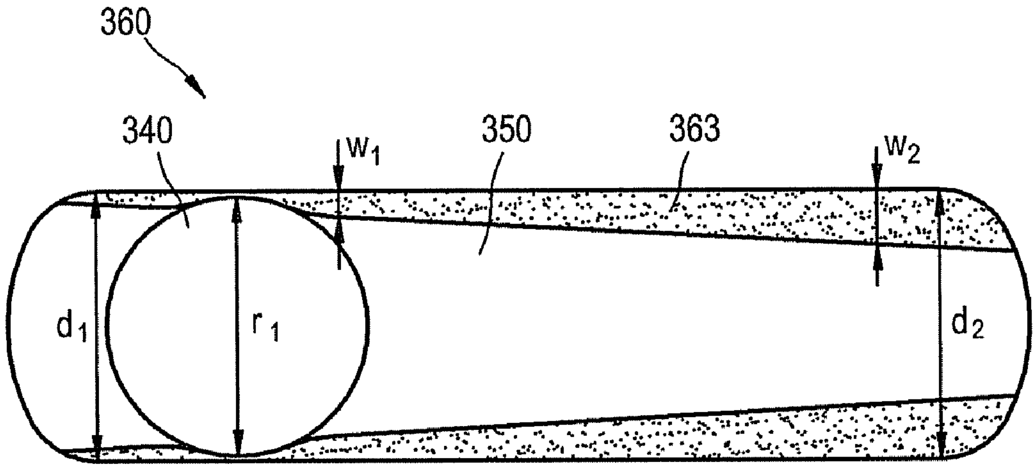

As shown in FIG. 7D, the door speed control unit 360 may include a frictional member 363 provided on the edges of the guide groove 350 so that the coupling boss 340 contacts the frictional member 363. The width of the frictional member 363 increases from w1 near the starting point 350s of the guide groove 350 to w2 near the ending point 350e of the guide groove 350e ($w1<w2$). This causes the frictional force between the coupling boss 340 and the guide groove 350 to increase as the coupling boss 340 moves along the guide groove 350 from the starting point 350s to the ending point 350e by increasing a surface roughness of the edges of the guide groove 350. Accordingly, when the coupling boss 340 moves along the guide groove 350 according to the rotation of the door 200, the frictional member 363 applies a force resisting the movement of the coupling boss 340 in a direction opposite to the moving direction of the coupling boss 340 to reduce the speed of the coupling boss 340, thereby reducing the rotating speed of the door 200 on which the coupling boss 340 is provided.

The frictional member 363 may be an elastic member, such as a sponge member, a rubber member, a fiber member, or a brush member.

Although FIG. 7D shows that the frictional member 363 is provided on the edges of the guide groove 350 to gradually increase the surface roughness of the guide groove 350, an elastic boss having a different thickness may be provided on the surface around but not in the guide groove 350 to obtain the same effect.

The door speed control unit 360 may include a cover member (not shown) that covers an upper surface of the guide groove 350 and has a thickness that increases from the starting point 350s to the ending point 350e. The cover member (not shown) contacts the moving coupling boss 340 to apply a frictional force to the moving coupling boss 340, like the frictional member 363 shown in FIG. 7D.

Although various examples of door speed control units 360 according to aspects of the invention have been shown in FIGS. 4-7D, it is understood that additional speed control elements can be included in a door speed control unit 360 according to other aspects of the invention, such as dampers, and/or springs, and/or torsional springs at the door hinge 310.

The opening and closing process of the door 200 of the image forming apparatus 1 according to aspects of the invention will now be described by referring to FIGS. 4 to 7D.

First, when a printing signal is supplied to the image forming apparatus 1 when the door 200 is rotated against the main body 100 and locked thereto as shown in FIGS. 3A and 4, the printing medium feeding unit 120 feeds a printing medium. The pick-up roller 123 picks up the printing medium from a knock-up plate 121a and supplies the printing medium to the printing medium conveying belt 221. The exposure unit 133 scans a light beam across each of the photosensitive bodies 131a provided for the colors YMCK to form an electrostatic latent image on each of the photosensitive bodies 131a. The developing roller 131c of each of the developing devices 131 provided for the colors YMCK supplies a developer to each of the photosensitive bodies 131a to develop the electrostatic latent image on each of the photosensitive bodies 131a to form developer in the form of an image on each of the photosensitive bodies 131a.

The printing medium conveying belt 221 sequentially conveys the printing medium to the developing devices 131 provided for the colors YMCK, and the transfer units 230 mounted at positions corresponding to the photosensitive bodies 131a of the developing devices 131 apply a transfer voltage to the rear surface of the printing medium via the printing medium conveying belt 221 to transfer the developer in the form of an image from the photosensitive bodies 131a onto the printing medium.

If the printing medium jams while it is being conveyed by the printing medium conveying belt 221 to the developing devices 131, the user unlocks the door 200 and pulls on the door 200 to rotate the door 200 away from the main body 100 so that the user can clear the jam. As shown in FIG. 5, the coupling boss 340, which was located at the starting point 350s of the guide groove 350 when the door 200 was locked, is forced out of the starting point 350s against the elastic force applied to the coupling boss 340 by the edges of the guide groove 350 by the pulling force applied to the door 200 by the user, and moves along the guide groove 350 according to the rotation of the door 200 as the door 200 rotates under its own weight if the user lets go of the door 200 after opening it.

As shown in the enlarged area of FIG. 4, an elastic force F1 that resists the movement of the coupling boss 340 is applied to the coupling boss 340 by the area between the guide groove 350 and the speed control groove 361. However, since the distance h1 between the guide groove 350 and the speed control groove 361 is small, the magnitude of the force F1 is small, and the moving coupling boss 340 elastically deforms the guide groove 350 and the speed control groove 361 by an amount δ1 according to the speed of the moving coupling boss 340.

As shown in FIG. 5, after the coupling boss 340 has moved along the guide groove 350 to a point somewhere between the starting point 350*s* and the ending point 350*e*, a force F2 that is larger than the force F1 is applied to the coupling boss 340 because the distance h2 between the guide groove 350 and the speed control groove 361 at this point is greater than the distance h1 at the starting point 350*s* (h2>h1). Accordingly, the amount δ2 by which the moving coupling boss 340 elastically deforms the guide groove 350 and the speed control groove 361 is smaller than the amount δ1 shown in FIG. 4 (δ2<δ1). Accordingly, the moving speed of the coupling boss 340 and thus the rotating speed of the door 200 are reduced at the point shown in FIG. 5 compared to the speed at the starting point 350*s* shown in FIG. 4.

As shown in FIG. 6, when the coupling boss 340 reaches the ending point 350*e*, the force applied to the coupling boss 340 reaches a maximum value of F3 (F1<F2<F3) because the distance h3 between the guide groove 350 and the speed control groove 361 at this point is a maximum, and the amount by which the coupling boss 340 elastically deforms the guide groove 350 and the speed control groove 361 reaches a minimum value of δ3 (δ1>δ2>δ3). Accordingly, the moving speed of the coupling boss 340 and thus the rotating speed of the door 200 reach a minimum at the ending point 350*e*.

Thus, in a door speed control unit 360 according to an aspect of the invention as shown in FIGS. 4-6, the frictional force between the coupling boss 340 and the guide groove 350 varies as the coupling boss 340 moves along the guide groove 350 according to a distance between the guide groove 350 and the speed control groove 361. Also, the frictional force between the coupling boss 340 and the guide groove 350 as the coupling boss 340 moves along the guide groove 350 may be proportional to the distance between the guide groove 350 and the speed control groove 361. However, it is understood that the frictional force between the coupling boss 340 and the guide groove 350 as the coupling boss 340 moves along the guide groove 350 may be a non-linear function of a position of the coupling boss 340 in the guide groove and/or a distance between the guide groove 350 and the speed control groove 361.

As described above, the image forming apparatus 1 according to aspects of the invention includes a door speed control unit 360 that reduces the moving speed of the coupling boss 340 as it moves along the guide groove 350 as the door 200 rotates away from the main body 100, thereby reducing the rotating speed of the door 200 as the door 200 rotates away from the main body 100.

Figure 8:
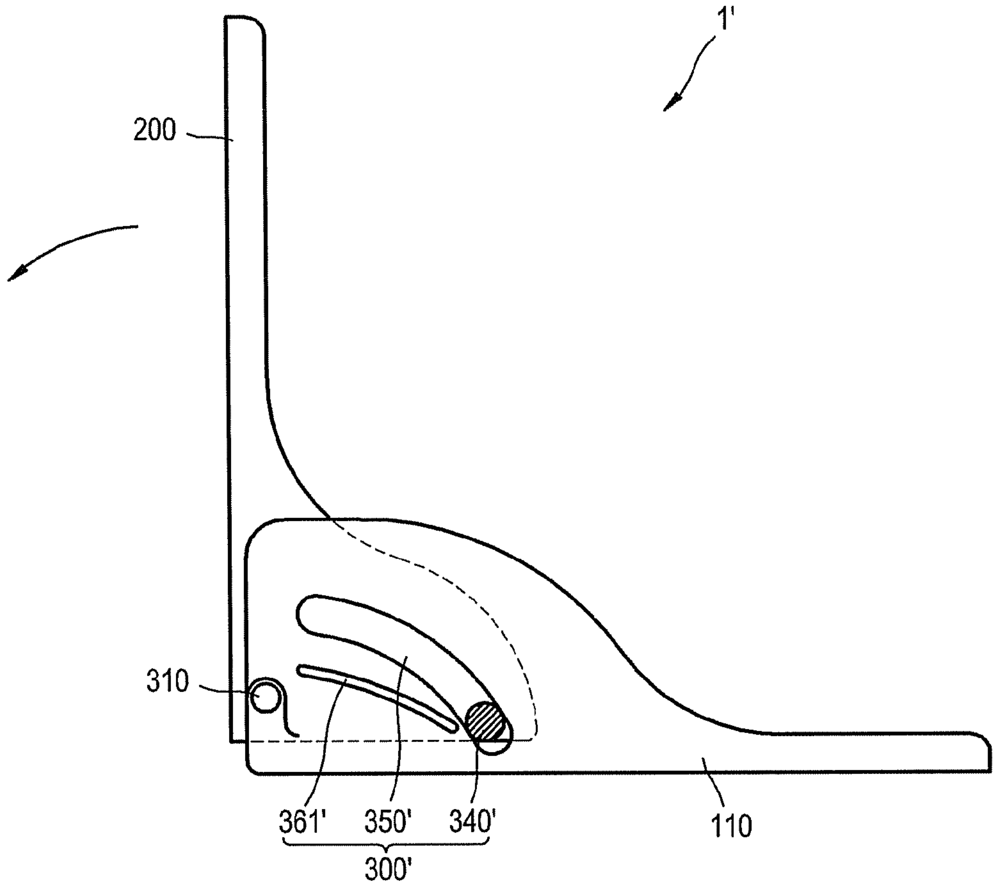
FIG. 8 is a partial diagram of an image forming apparatus according to an aspect of the invention.

FIG. 8 is a partial diagram of an image forming apparatus 1' according to an aspect of the invention. In the image forming apparatus 1', a coupling boss 340' is provided on the door 200, and a guide groove 350' and a speed control groove 361' are provided directly in the main body 100. Accordingly, as the door 200 rotates away from the main body 100, the coupling boss 340' moves along the guide groove 350', and the rotating speed of the door 200 is gradually reduced by the effect of the speed control groove 361'.

Thus, the image forming apparatus 1' according to an aspect of the invention does not include a link member 320 as does the image forming apparatus 1 according to an aspect of the inventions shown in FIGS. 4-6, and thus has a simpler configuration.

As described above, an image forming apparatus according to an aspect of the invention includes a door speed control unit that reduces a rotating speed of a door as the door rotates away from the image forming apparatus.

Accordingly, an impact transmitted to a printing medium conveying belt and transfer units mounted on the door as the door rotates and stops can be reduced to a minimum. Therefore, the deterioration of the printing quality caused by deformation of the printing medium conveying belt and the transfer units due to such an impact can be prevented.

As described above, the door opening and closing unit and the image forming apparatus having the same according to aspects of the invention can reduce the rotating speed of the door as it rotates away from the main body, thereby minimizing the impact applied to the door as the door rotates and stops, particularly when the door comes to a sudden stop in the fully open position as a result of the user letting go of the door after opening it.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A door opening and closing unit for an image forming apparatus, the image forming apparatus comprising a main body, and a door rotatably mounted on the main body, the door opening and closing unit comprising:

a door speed control unit coupling the door to the main body, the door speed control unit comprising:

a coupling boss;

a guide groove that engages the coupling boss and along which the coupling boss moves as the door rotates relative to the main body; and a speed control groove provided on one side of the guide groove inclined at a predetermined angle with respect to a lengthwise direction of the guide groove, wherein the door speed control unit controls a frictional force between the coupling boss and the guide groove according to a rotating angle of the door relative to the main body to control a rotating speed of the door as the door rotates relative to the main body, wherein the door speed control unit gradually reduces a rotating speed of the door as the door rotates from a closed position in which the door is rotated against the main body to a fully open position in which the door is maximally rotated away from the main body.

2. The door opening and closing unit of claim 1, wherein the guide groove comprises:

a starting point at which the coupling boss is positioned when the door is in the closed position; and an ending point at which the coupling boss is positioned when the door is in the fully open position; and wherein a width of the guide groove at the starting point is greater than a width of the coupling boss.

3. The door opening and closing unit of claim 2, wherein the width of the guide groove decreases from the starting point to the ending point according to a distance along the guide groove from the starting point.

4. The door opening and closing unit of claim 2, wherein the width of the guide groove at the ending point is less than the width of the coupling boss.

5. The door opening and closing unit of claim 2, wherein the door speed control unit further comprises a frictional member disposed so that the coupling boss is in contact with the frictional member as the coupling boss moves along the guide groove as the door rotates relative to the main body; and wherein a thickness of the frictional member increases from the starting point of the guide groove to the ending point of the guide groove according to a distance along the guide groove from the starting point.

6. The door closing and opening unit of claim 5, wherein the frictional member is disposed on edges of the guide groove so that the coupling boss contacts the frictional member as the coupling boss moves along the guide groove as the door rotates relative to the main body; and wherein the thickness of the frictional member increases in a width direction of the guide groove from the starting point of the guide groove to the ending point of the guide groove according to a distance along the guide groove from the starting point.

7. The door opening and closing unit of claim 5, wherein the frictional member is one of a sponge member, a brush member, a fiber member, and a rubber member.

8. The door opening and closing unit of claim 1, wherein the guide groove comprises:

a starting point at which the coupling boss is positioned when the door is in the closed position; and an ending point at which the coupling boss is positioned when the door is in the fully open position; and wherein the predetermined angle is an angle that causes a distance between the guide groove and the speed control groove to increase from the starting point to the ending point according to a distance along the guide groove from the starting point.

9. The door opening and closing unit of claim 1, further comprising a link member rotatably mounted on the main body or the door;

wherein if the link member is rotatably mounted on the main body, the door speed control unit couples the link member to the door; and wherein if the link member is rotatably mounted on the door, the door speed control unit couples the link member to the main body.

10. A door opening and closing unit for an image forming apparatus, the image forming apparatus comprising a main body, and a door rotatably mounted on the main body, the door opening and closing unit comprising:

a door speed control unit coupling the door to the main body, the door speed control unit comprising:

a coupling boss a guide groove that engages the coupling boss and along which the coupling boss moves as the door rotates relative to the main body, the guide groove comprising a starting point at which the coupling boss is positioned when the door is in the closed position, and an ending point at which the coupling boss is positioned when the door is in the fully open position; and a speed control groove provided on one side of the guide groove so that the speed control groove is farthest from the guide groove at the starting point of the guide groove, and is closest to the guide groove at the ending point of the guide groove, wherein the guide groove is a straight groove or a curved groove; and wherein the speed control groove is a straight groove or a curved groove, wherein the door speed control unit controls a frictional force between the coupling boss and the guide groove according to a rotating angle of the door relative to the main body to control a rotating speed of the door as the door rotates relative to the main body, wherein the door speed control unit gradually reduces a rotating speed of the door as the door rotates from a closed position in which the door is rotated against the main body to a fully open position in which the door is maximally rotated away from the main body.

11. A door opening and closing unit for an image forming apparatus, the image forming apparatus comprising a main body, and a door rotatably mounted on the main body, the door opening and closing unit comprising:

a door speed control unit coupling the door to the main body, the door speed control unit comprising:

a coupling boss;

a guide groove that engages the coupling boss and along which the coupling boss moves as the door rotates relative to the main body;

a first speed control groove provided on a first side of the guide groove inclined at a first predetermined angle with respect to a lengthwise direction of the guide groove; and a second speed control groove provided on a second side of the guide groove inclined at a second predetermined angle with respect to the lengthwise direction of the guide groove, wherein the door speed control unit controls a frictional force between the coupling boss and the guide groove according to a rotating angle of the door relative to the main body to control a rotating speed of the door as the door rotates relative to the main body, and wherein the door speed control unit gradually reduces a rotating speed of the door as the door rotates from a closed position in which the door is rotated against the main body to a fully open position in which the door is maximally rotated away from the main body.

12. The door opening and closing unit of claim 11, wherein the second predetermined angle is different from the first predetermined angle.

13. The door opening and closing unit of claim 11, wherein the guide groove comprises:

a starting point at which the coupling boss is positioned when the door is in the closed position; and an ending point at which the coupling boss is positioned when the door is in a fully open position in which the door is rotated as far away from the main body as it will go;

wherein the first predetermined angle is an angle that causes a distance between the guide groove and the first speed control groove to increase from the starting point to the ending point according to a distance along the guide groove from the starting point; and wherein the second predetermined angle is an angle that causes a distance between the guide groove and the second speed control groove to increase from the starting point to the ending point according to a distance along the guide groove from the starting point.

14. The door opening and closing unit of claim 13, wherein the distance between the guide groove and the second speed control groove is different from the distance between the guide groove and the first speed control groove at least one point along the guide groove.

15. A door speed control unit for use in an image forming unit having a door rotatably attached to a housing a hinge to enable the door to open and close by rotating relative to the housing, the door speed control unit comprising:

a boss connectable to the door or the housing; and a surface comprising a groove into which the boss is slideably inserted to slide in an opening direction as the door opens and at least one additional groove defining an area between the additional groove and the groove, the area having an increasing area as a function of distance in the opening direction that increases an amount of friction applied to the boss as the boss slides in the opening direction;

wherein the surface comprising the groove is shaped to increasingly interfere with a sliding movement of the boss in the opening direction in proportion to a distance traveled by the boss in the opening direction so as to decrease a rotational rate at which the door rotates relative to the housing as the door opens.

16. The door speed control unit of claim 15, wherein the groove is curved about a first radius to generally correspond to a direction of rotation of the door relative to the housing; and wherein the at least one additional groove is curved about a second radius other than the first radius so as to define the area.

17. The door speed control unit of claim 15, wherein the groove is curved to generally correspond to a direction of rotation of the door relative to the housing.

18. The door speed control unit of claim 15, wherein the groove has a decreasing width as a function of distance in the opening direction that increases an amount of friction applied to the boss as the boss slides in the opening direction.

* * * * *

UNITED STATES PATENT AND TRADEMARK OFFICE

CERTIFICATE OF CORRECTION

PATENT NO. : 7,864,300 B2
APPLICATION NO. : 12/025993
DATED : January 4, 2011
INVENTOR(S) : Jin-soo Lee et al.

It is certified that error appears in the above-identified patent and that said Letters Patent is hereby corrected as shown below:

Column 15, Line 49, In Claim 10, delete "boss" and insert --boss;--, therefor.

Column 16, Line 64, In Claim 15, delete "housing" and insert --housing using--, therefor.

Signed and Sealed this
Nineteenth Day of April, 2011

David J. Kappos
*Director of the United States Patent and Trademark Office*